July 25, 1933. A. S. HOWELL 1,919,554
TRIPOD HEAD OR THE LIKE
Filed Dec. 23, 1929 3 Sheets-Sheet 1
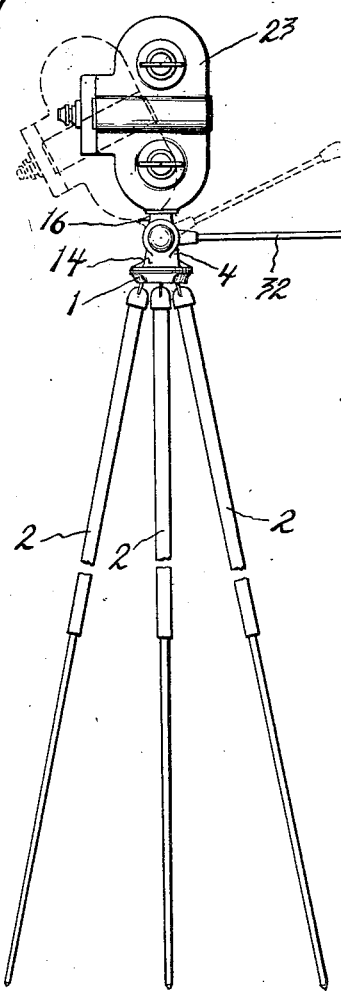
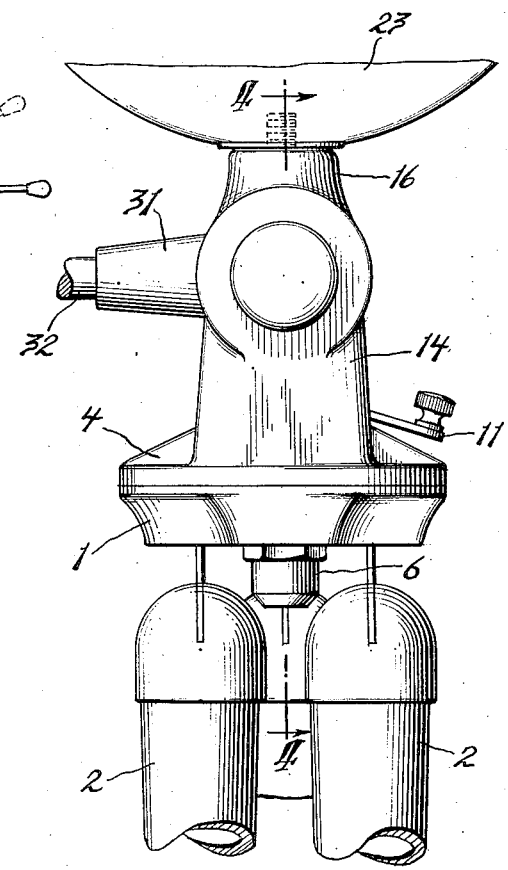
Inventor:
Albert S. Howell,
By Miehle & Miehle,
Att'ys.

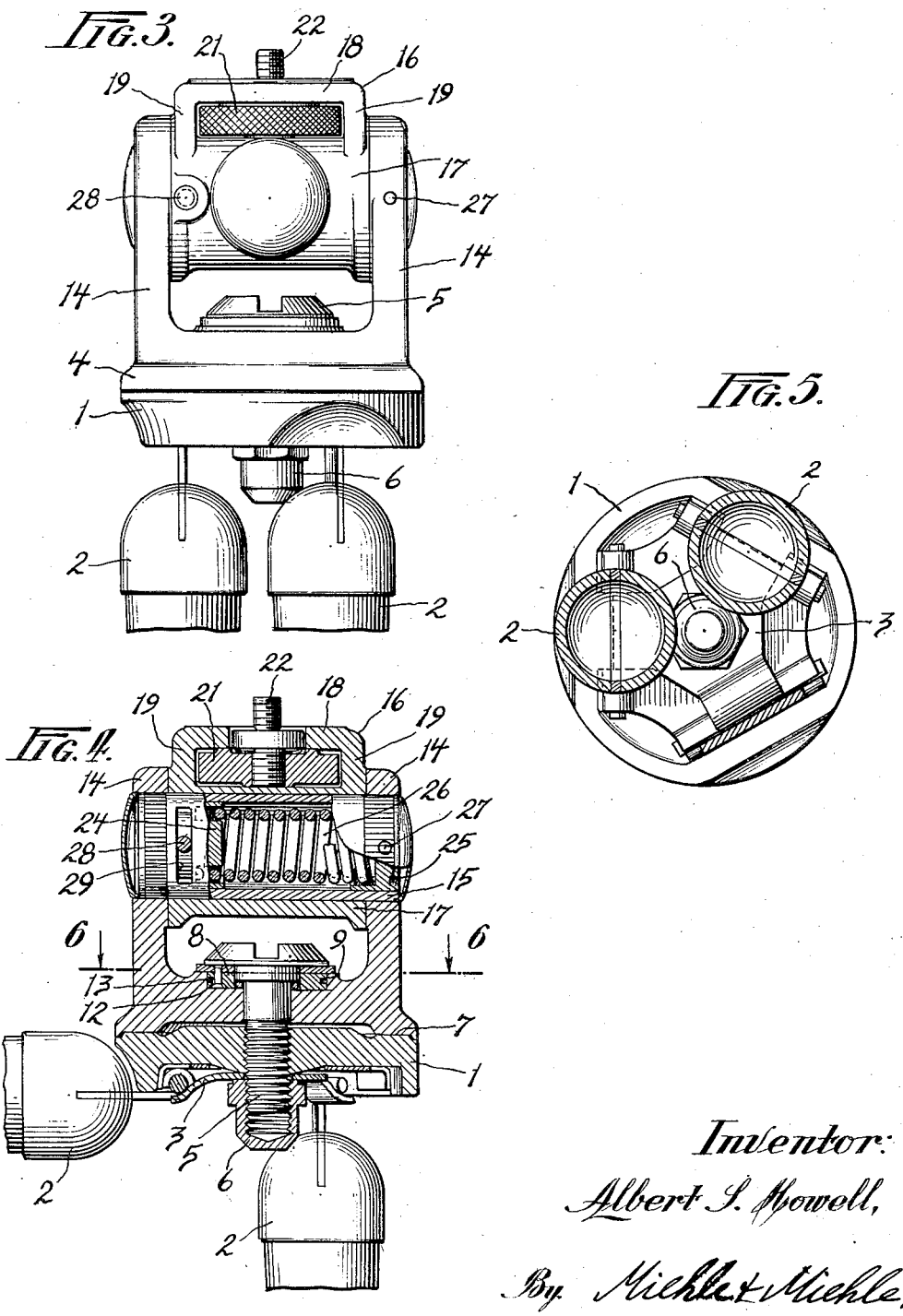

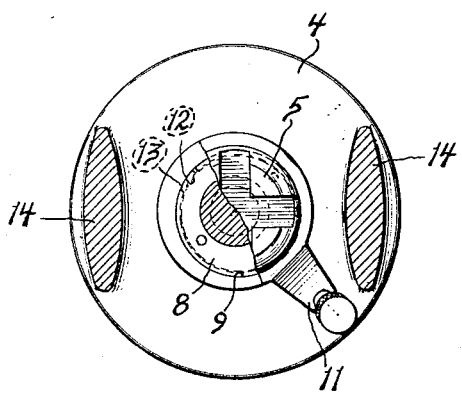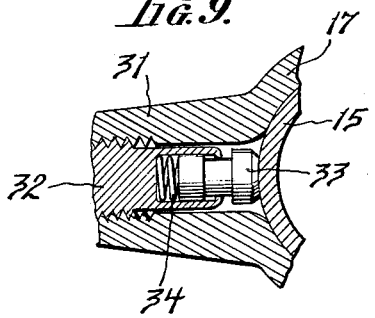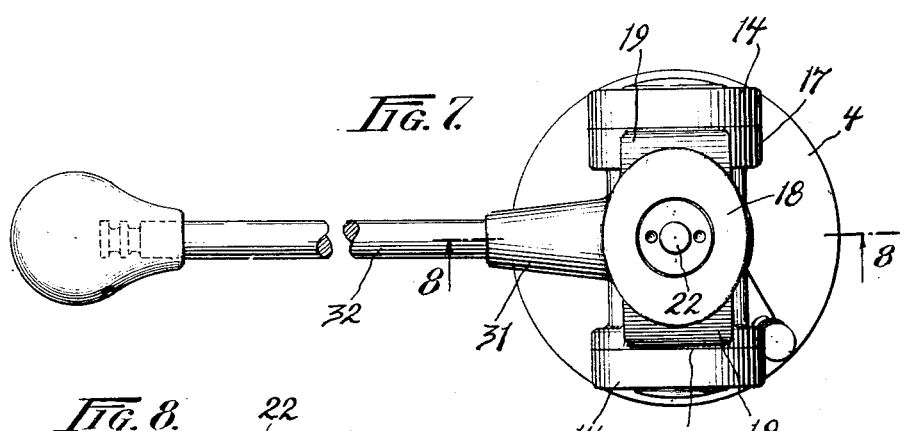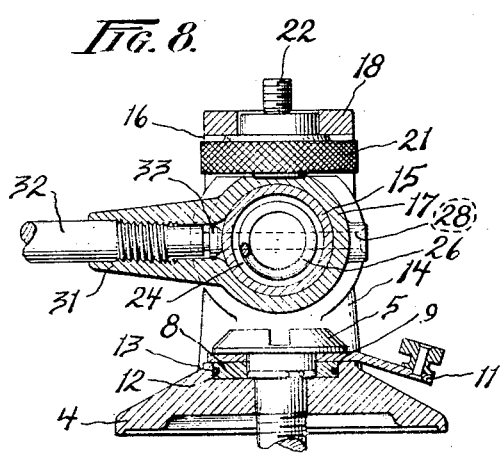

Patented July 25, 1933

1,919,554

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

TRIPOD HEAD OR THE LIKE

Application filed December 23, 1929. Serial No. 415,909.

My invention has particular relation to the heads of tripods or motion picture cameras although not limited to this use alone.

The principal objects of my invention reside in the provision of a tripod head which is simple, compact, convenient, and particularly adapted for motion picture cameras, and which provides for a much desired quick, convenient, smooth and easily controlled movement of a camera or other device mounted thereon.

With these objects in view my invention consists in certain features of novelty in the construction, combination and arrangement of parts by which the said objects and certain other objects, hereinafter appearing are effected, all as fully described with reference to the accompanying drawings and more particularly pointed out in the appended claims.

In the said drawings—

Figure 1 is a reduced side elevation of a tripod embodying my invention and having a motion picture camera mounted thereon;

Figure 2 is a partial similar elevation of the same;

Figure 3 is a side elevation of the tripod head taken at a right angle to Figure 2;

Figure 4 is a central vertical section of the tripod head on the line 4—4 of Figure 2;

Figure 5 is a sectional view of the tripod showing the tripod head in bottom plan view;

Figure 6 is a sectional view substantially on the line 6—6 of Figure 4;

Figure 7 is a top plan view of the tripod head;

Figure 8 is a partial central vertical section on the line 8—8 of Figure 7; and

Figure 9 is an enlarged partial section on the line 8—8 of Figure 7.

Like characters of reference indicate like parts in the several views.

Referring to the drawings, 1 designates a base member of the tripod head, and pivotally mounted in usual arrangement on the underside of this base member are three legs 2. See Figures 1, 4 and 5. The legs 2 are pivotally connected to the base member by means, including a centrally apertured spring member 3, fully described and claimed in my co-pending application for U. S. patent, Serial No. 401,022, filed October 21, 1929, for improvement in tripod, and which requires no further description herein.

Disposed above the base member 1 is a turntable head member 4, and a headed screw stud 5 passes downwardly through a central bore through the turntable member and has a bearing engagement therein, and is screwthreaded through a central bore through the base member, and, passing through the central aperture of the spring member 3, has a nut 6 screwthreaded on the lower end thereof to lock the screw stud, in longitudinally adjusted position, with the base member and to secure the spring member 3 on the base member. See Figures 3 and 4.

Thus the turntable 4 is mounted on the base member 1 for angular movement in a horizontal plane, and supplementing the bearing provided by the stud 5, the turntable member has a circular marginal bearing engagement with the base member 1, as designated at 7 in Figure 4.

This angular movement of the turntable member 4 with reference to the base 1, provides for "panoraming" movement, and to provide for locking the turntable member in angularly adjusted position on the base, the following is provided. See Figures 4, 6 and 8.

An eccentric ring 8 has its bore engaged for angular movement on the stud 5 and is disposed between the head of the stud and the turntable member and is engaged for angular movement in a counterbore 9 in the upper surface of the turntable member and surrounding and disposed eccentrically with respect to the stud.

When the eccentric ring 8 is angularly positioned with the center of its periphery alined with the center of the counterbore 9, the bore of the eccentric ring is coaxial with the bore of the turntable member engaged by the stud 5, so that the turntable member is free to be turned with reference to the base member 1.

When the eccentric ring 8 is angularly positioned with the center of its periphery out of alinement with the center of the counterbore 9, the ring cramps between the stud 5 and the counterbore 9, so that the turntable member is locked with the base against turning.

The eccentric ring is provided with a radial arm 11 overlying the turntable for the manual actuation thereof to lock and release the turntable member.

The periphery of the eccentric ring is provided with a peripheral groove 12 in which is engaged a split spring ring 13 which frictionally engages the counterbore 9 and the eccentric ring to insure movement of the eccentric ring, when in unlocked position, with the turntable member.

The turntable member 4 is provided with two spaced upwardly extending coaxially bored arms 14, and an axially bored cylindrical bearing member 15 extends horizontally across between said arms and is engaged in the bores thereof. See Figures 4 and 8.

A carrier member, generally designated at 16, is provided with a bored portion 17 which has a bearing engagement on the bearing member 15 between the arms 14 which provide thrust bearings therefor, the carrier member being thus mounted for angular movement in a vertical plane.

The carrier member 16 comprises the bored or pivot portion 17, a platform formation 18 disposed in adjacently spaced parallelism therewith and a pair of connecting portions 19 therebetween and spaced longitudinally of the axis of the pivot formation 17. See Figures 3, 4 and 8.

A finger wheel 21 is disposed between the pivot formation 17 and the platform formation 18 and between the connecting formations 19 on an axis normal to the platform formation and is adapted to be grasped between the fingers of the hand transversely of the pivot formation. A screwthreaded securing stud 22 extends through a central bore through the platform formation 18 and is secured with the finger wheel coaxially thereof.

The finger wheel has axial engagement with the platform formation and the pivot formation whereby the wheel and stud 22 are retained on the carrier member and whereby to clamp a device, such as a motion picture camera 23, on the platform by engagement of the stud 22 in a screwthreaded bore in the camera. See Figures 1 and 2.

As so mounted on the tripod head, the camera is movable angularly in a horizontal plane and in a vertical plane.

In order that the movement of the camera in a vertical plane may be quick, convenient, smooth and easily controlled the following is provided.

Arranged in spaced relation in the bore of the bearing member 15 and engaged therein are two plugs 24 and 25, and a helical torsion spring 26 extends in said bore between these plugs and has its ends secured in a suitable manner to respective of said plugs. See Figures 4 and 8.

The spring 26 and plugs 24 and 25 are thus disposed in the bore of the bearing member 15 and on the pivotal axis of the carrier member 16, and the plug 24 is angularly movable in the bearing member while the plug 25 is fixed with the turntable member 4 and with the bearing member by means of a pin 27 engaged in diametrical bores through the plug 25, the bearing member 15 and the adjacent arm 14 of the turntable member.

A pin 28 is engaged in a diametrically disposed bore through the plug 24 and, extending through angular slots 29 through the bearing member 15, is engaged and fixed in a diametrical bore through the pivot or bored portion 17 of the carrier member 16.

Accordingly the spring 26 is operative on the carrier member 16 in both directions to yieldably urge the same from opposite positions in its said pivotal movement to an intermediate position, and the arrangement is such that in this intermediate position the camera 23 is upright with its weight substantially centered with the pivotal axis of the carrier member, as shown in full lines in Figure 1.

As the camera is tilted, as shown in dotted lines in Figure 1 or in the opposite direction, the influence of the weight thereof is counterbalanced by the spring 26 with obvious advantage.

The carrier member is provided with a concentrically bored boss 31 disposed radially of the bored pivot portion 17 of the carrier member and the bore of this boss communicates with the bore of the pivot portion 17. See Figures 1, 7 and 8. An operating rod 32 is screwthreaded into the bore of the boss 31 and provides a convenient means for manually tilting the carrier member 16 or angularly moving the turntable member 4 for aiming the camera 23.

The operating rod is provided with a bore in its inner end, and a friction plunger 33 is mounted for longitudinal movement in this bore and is maintained in frictional engagement with the bearing member 15 by means of a helical compression spring 34 within this bore. See Figures 8 and 9.

The force of the spring 26 as the camera 23 is tilted substantially balances the influence of the weight of the camera and the carrier member 26 and parts thereon, and the friction effected by spring pressed engagement of the plunger 33 against the bearing member 16, is adjustable by rotation of the operating rod 32 by reason of this rod being screwthreaded in the bore of the boss 31, for varying the friction to obtain the desired tilting action and to maintain the camera in adjusted positions of its tilting movement.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a tripod head or the like the combination with a head member, of a carrier member, one of said members being provided with spaced coaxially bored arms, an axially bored cylindrical bearing member extending across between said arms and engaged in the bores thereof and engaged in a bore through the other of said members between said arms for forming a pivotal connection between said members, a helical torsion spring in the bore of said bearing member and having one end fixed with one of said arms, and a connecting member fixed with the other end of said spring and extending through an angular slot through said bearing member and connected with said other of said members.

2. In a tripod head or the like the combination with a head member provided with spaced coaxially bored arms, of a carrier member, an axially bored cylindrical bearing member extending across between said arms and engaged in the bores thereof and secured therewith and having a bearing engagement in a bore through said carrier member between said arms for forming a pivotal connection between said members, a helical torsion spring in the bore of said bearing member, a plug engaged in the bore of said bearing member and fixed with said head member and bearing member and having one end of said spring secured therewith, a second plug rotatably engaged in the bore of said bearing member and having the other end of said spring secured thereto, and a pin engaged in a diametrically disposed bore through said second plug and extending through angular slots through said bearing member and secured with said head member.

3. In a tripod head or the like the combination with a head member, of a carrier member, a cylindrical pivot bearing therebetween including spaced formations on one of said members and an axially bored cylindrical formation extending therebetween, and a helical torsion spring counterbalancing means disposed on the axis of said bearing and extending within said bored formation and operative to counterbalance said carrier member in its pivotal movement.

4. In a tripod head or the like the combination with a head member, of a carrier member, one of said members being provided with a bore, an axially bored cylindrical bearing member having a bearing engagement in said bore and engaging with said other member for forming a pivotal connection between said members, and a torsional spring counterbalancing means extending within the bore of said bearing member for counterbalancing said carrier member in its pivotal movement.

ALBERT S. HOWELL.